Feb. 23, 1971     J. A. DARGELO     3,565,484
ARM REST FOR AUTOMOBILE SEAT
Filed Nov. 29, 1968     2 Sheets-Sheet 1
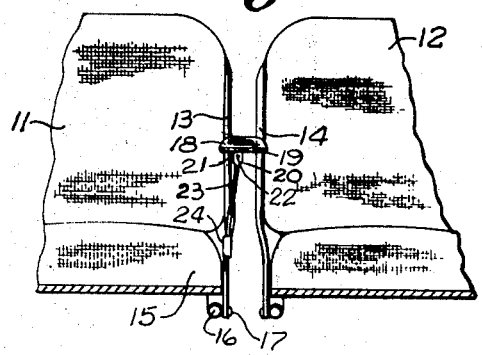
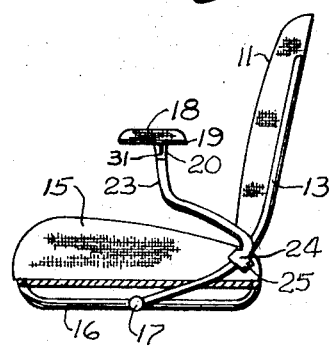
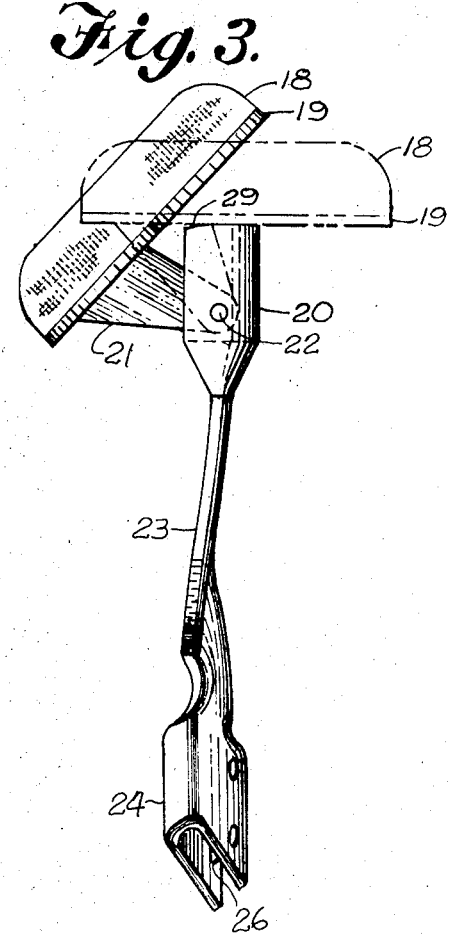
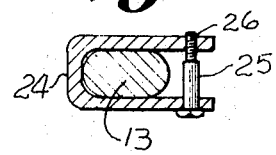
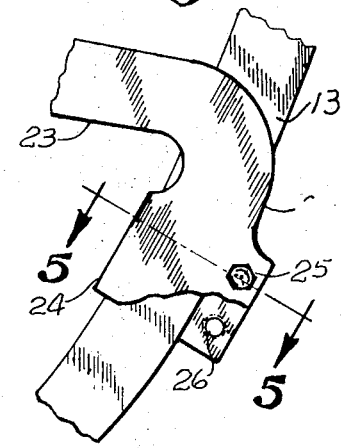
INVENTOR.
JULIO A. DARGELO
BY
Bryan and Butrum Feb. 23, 1971         J. A. DARGELO         3,565,484
ARM REST FOR AUTOMOBILE SEAT
Filed Nov. 29, 1968                    2 Sheets-Sheet 2

INVENTOR.
JULIO A. DARGELO
BY
Bryan and Butrum

United States Patent Office 3,565,484
Patented Feb. 23, 1971

3,565,484
ARM REST FOR AUTOMOBILE SEAT
Julio A. Dargelo, 1030 W. 28th St.,
Hialeah, Fla. 33010
Filed Nov. 29, 1968, Ser. No. 779,753
Int. Cl. A47c 7/54
U.S. Cl. 297—417                                    7 Claims

ABSTRACT OF THE DISCLOSURE

A support portion includes an attaching means at one end thereof which is adapted to be clamped on a frame of a seat. The support portion extends upwardly and includes an upper end to which is pivotally interconnected an arm rest portion. This arm rest portion is adapted to swing to one side of the support portion so as to enable an adjacent seat to be pivoted forwardly.

BACKGROUND OF THE INVENTION

The present invention relates to an arm rest adapted to be attached to an automobile seat to provide an arm rest at a location where no arm rest ordinarily is present. The arm rest of the present invention is particularly adapted to be mounted between a pair of adjacent separate and independently operable seats such as provided in the front of some automobiles, and wherein the back rests of these seats swing forwardly to provide access to the rear seat. Such seats are commonly employed in compact cars such as a Volkswagen, and the present invention is particularly adapted for use with the front seats of a Volkswagen automobile.

The arm rest is adapted to be mounted between the two front seats of an automobile so as to substantially increase the comfort of both the driver and a passenger sitting next to the driver, the arm rest being so positioned that it can be utilized by both the driver and the passenger.

It is accordingly necessary to provide an arm rest arrangement including means for mounting the arm rest in proper operative position and for supporting it from the frame of one of the front seats of an automobile.

A particular problem with such an arrangement is to provide an arm rest which is suitably positioned and yet which at the same time will not interfere with normal operation of the front seats. Both of the front seats in such an automobile have back rests which are adapted to pivot forwardly. The arm rest must accordingly be of such a construction that it will permit each of the seats to be pivoted forwardly either together or independently of one another.

SUMMARY OF THE INVENTION

In the present invention, a support portion includes an attaching means at one end thereof for attaching the support portion to the frame of one of the front seats of an automobile. The attaching means is of such a construction so that it may be readily attached in a simple manner to the frame even by unskilled persons.

An arm rest portion is pivotally secured to the upper end of the support portion and in its operative position is adapted to support the arm of either the driver or a passenger. The arm rest is secured to one of the seats, and is preferably secured to the passenger seat. The arm rest is adapted to swing forwardly with the back of the passenger seat and therefore does not interfere with the swinging movement of the passenger seat.

Additionally, the arm rest portion is swingably mounted at the upper end of the support portion so that it can swing out of the way and permit the back of the driver's seat to be pivoted forwardly. In this manner, the arm rest enables normal movement of each of the seats and in no way interferes with the customary usage thereof.

BRIEF DESCRIPTION OF THE DRAWINGS

FIG. 1 is a front view partly broken away of a pair of front seats in an automobile and illustrating the arm rest supported in operative position on one of the seats;

FIG. 2 is a side view of the seat shown in FIG. 1 having the arm rest mounted thereon;

FIG. 3 is an enlarged front view of the arm rest of the present invention showing the manner in which the arm rest can be swung into a inoperative position;

FIG. 4 is an enlarged view partly broken away showing the attaching means of the arm rest;

FIG. 5 is a sectional view taken substantially along line 5—5 of FIG. 4 looking in the direction of the arrows;

DESCRIPTION OF THE PREFERRED EMBODIMENT

Figure 7:
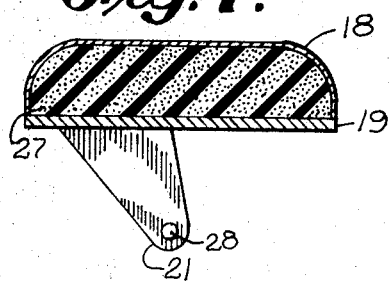
FIG. 7 is a sectional view taken substantially along line 7—7 of FIG. 6 looking in the direction of the arrows.
Figure 8:
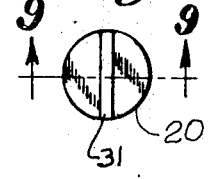
FIG. 8 is a top view of the upper end of the support portion of the structure.

Referring now to the drawings wherein like reference characters designate corresponding parts throughout the several views, the back rest of the passenger seat or the right front seat of an automobile is indicated by reference numeral 11, and the back rest of the left front seat of the automobile is indicated by reference numeral 12. The back rests 11 and 12 are carried by frames 13 and 14 respectively of conventional construction. The passenger's seat 15 is supported by a frame 16, the back rest frame 13 being pivotally interconnected with frame 16 at point 17. It will be understood that frame 14 is similarly pivotally interconnected with the frame supporting the driver's seat.

Figure 6:
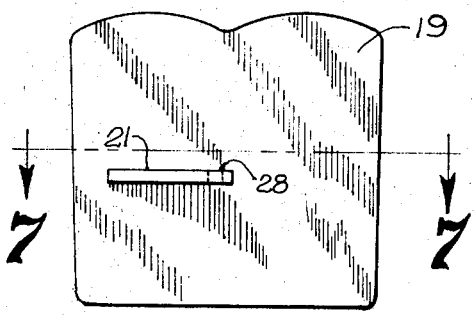
FIG. 6 is a bottom view of the arm rest portion of the structure.
Figure 9:
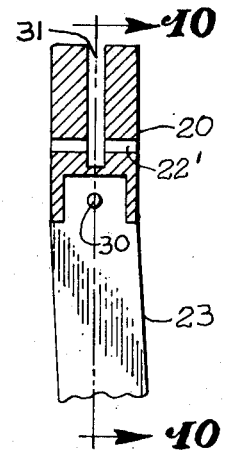
FIG. 9 is a sectional view taken substantially along line 9—9 of FIG. 8 looking in the direction of the arrows.

An arm rest portion includes a resilient cushioning means 18 suitably mounted on a flat plate 19 having a plan configuration as seen most clearly in FIG. 6. Plate 19 includes a depending flat generally triangular-shaped part 27, the lower end of this part having a hole 28 formed therethrough as seen most clearly in FIG. 7. Part 27 fits within a slot 31 formed in the upper end 20 of the support portion of the apparatus, and a pivot pin 22 extends through a hole 22' formed in the upper end 20 of the support portion and through the aligned hole 28 formed in plate 21 for pivotally supporting the resilient cushioning portion on the support portion.

Figure 10:
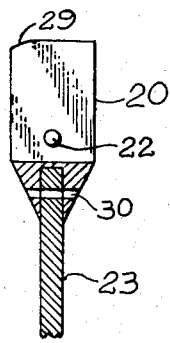
FIG. 10 is a sectional view taken substantially along line 10—10 of FIG. 9 looking in the direction of the arrows.

The upper end 20 of the support portion is secured to an intermediate portion 23 thereof by a suitable pin 30 as seen most clearly in FIG. 10. The intermediate portion 23 of the support portion curves downwardly and rearwardly as seen in FIG. 2 and terminates in an attaching portion 24 which comprises a bifurcated end as seen most clearly in FIG. 3. It will also be noted as seen in FIG. 1 that when the arm rest is in its operative position, the upper end 20 of the support portion is in a vertical plane offset from the lower end including the attaching portion 24. This offset can also be seen in FIG. 3 of the drawings.

The attaching portion 24 has a plurality of aligned holes 26 formed therein, certain of these holes being threaded for receiving the threaded end of screws 25 which as seen most clearly in FIG. 5 extend through the holes at one side of the bifurcated end and are threaded into the threaded holes at the other side thereof for clamping the attaching portion onto the back rest frame 13 of the associated seat.

As seen most clearly in FIGS. 3 and 10, the top surface of the upper end 20 of the support portion is substantially flat and is cut away as indicated at 29 at one side thereof to permit swinging movement of plate 19 with respect thereto. This cutout portion 29 is preferably formed on an arc struck from the center of pivot pin 22 so that the undersurface of plate 19 will clear the upper end of the support portion as it is swung from the operative phantom line position shown in FIG. 3 to the inoperative solid line position shown in this figure.

As seen in FIG. 7, the resilient cushioning means may include a central core 27 formed of foam rubber or the like, and this resilient cushioning means is suitably secured as by an adhesive to the upper surface of plate 19.

The arm rest of the present invention is shown in normal operative position in FIGS. 1 and 2 wherein the resilient cushioning means thereof is disposed in horizontal relationship for supporting the arm of either the driver or a passenger. If it is desired to swing the back rest 11 of the passenger seat forwardly, it can be swung forwardly in the usual manner, and the arm rest will be carried along therewith and will in no way interfere with this normal swinging movement.

On the other hand, if it is desired to swing the back rest of the driver's seat forwardly, the resilient cushioning means of the arm rest portion is pivoted from the phantom line position shown in FIG. 3 into the full line position so as to enable the back rest of the driver's seat to clear the arm rest. When the back rest of the driver's seat is again returned to its original position, the arm rest can be swung back into the position shown in FIGS. 1 and 2 to serve its intended function.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. An arm rest for an automobile seat comprising a support portion having attaching means at one end thereof for attaching the support portion to a pivotal backrest part of an automobile seat, said support portion including an upper end, and an arm rest portion movably connected with the upper end of said support portion for selective movement between operative and inoperative positions.

2. Apparatus as defined in claim 1 wherein said attaching means comprises a bifurcated end portion of said support portion, and means engaging said bifurcated end portion for clamping the bifurcated end portion to said pivotal backrest part of an automobile seat.

3. Apparatus as defined in claim 1 wherein said support portion curves forwardly and upwardly from said attaching means to said upper end, the upper end being disposed in a vertical plane offset from the vertical plane of said attaching means.

4. Apparatus as defined in claim 1 including a pivot pin supported by the upper end of said support portion, said arm rest portion being pivotally interconnected with said pivot pin.

5. Apparatus as defined in claim 4 wherein said upper end of the support portion has a groove formed therein, said arm rest portion including a depending part extending within said groove and said depending part being interconnected with said pivot pin.

6. Apparatus as defined in claim 1 wherein said arm rest portion is pivotally interconnected with the upper end of said support portion, said upper end having a cut away portion at one side permitting pivotal movement of said arm rest portion to one side of said upper end of the support portion.

7. Apparatus as defined in claim 6 wherein said cut away portion has a curved surface, said curved surface joining with a flat surface at the other side of said upper end of the support portion.

References Cited
UNITED STATES PATENTS

| | | | |
|---|---|---|---|
| 1,802,620 | 4/1931 | Scully | 297—417 |
| 2,592,702 | 4/1952 | Sprung | 297—417 |
| 3,265,436 | 8/1966 | La Bombard et al. | 297—417X |
| 3,439,889 | 4/1969 | Karlsen | 297—416X |

CASMIR A. NUNBERG, Primary Examiner

U.S. Cl. X.R.

297—414